May 18, 1954　　　　　C. F. KOCH　　　　　2,678,992
COLLAPSIBLE POULTRY WATER HEATER
Filed Sept. 9, 1953　　　　　　　　　　　　　2 Sheets-Sheet 1
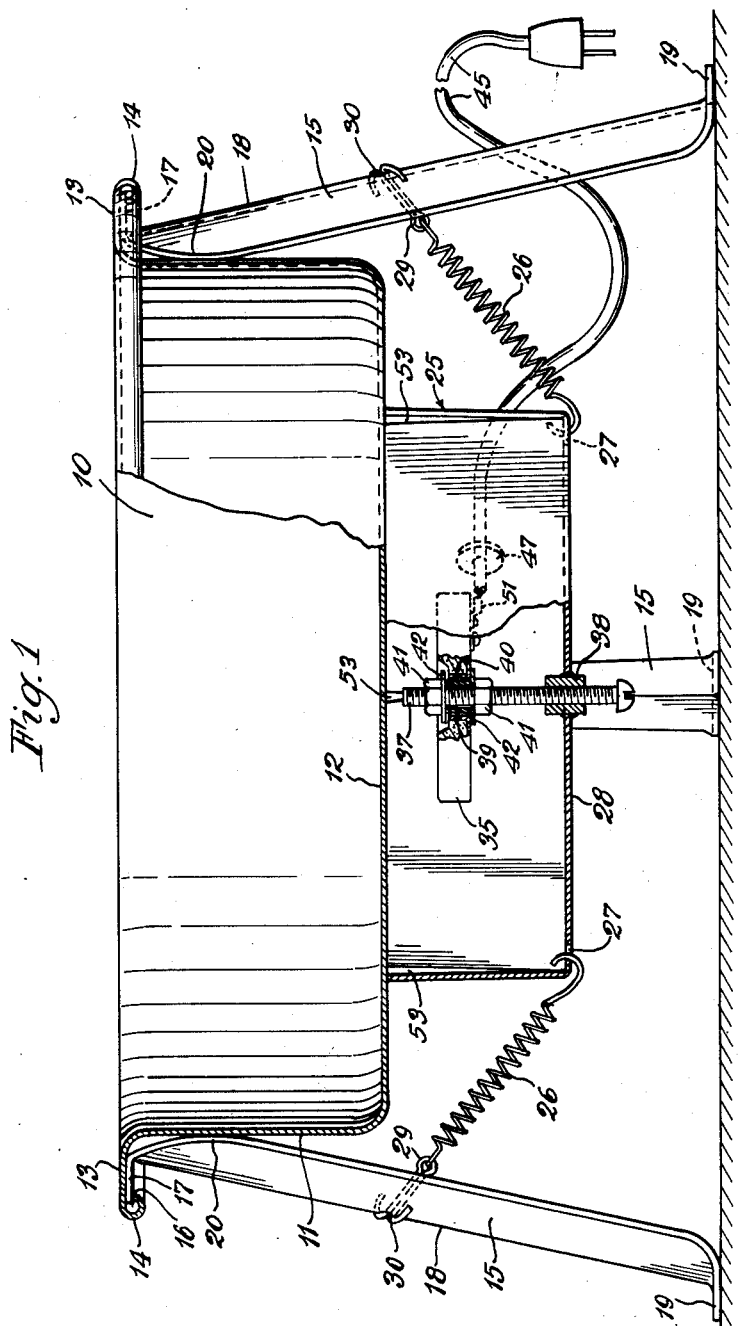
Inventor
Carl F. Koch
by Singer Stern & Carlberg
Attorneys

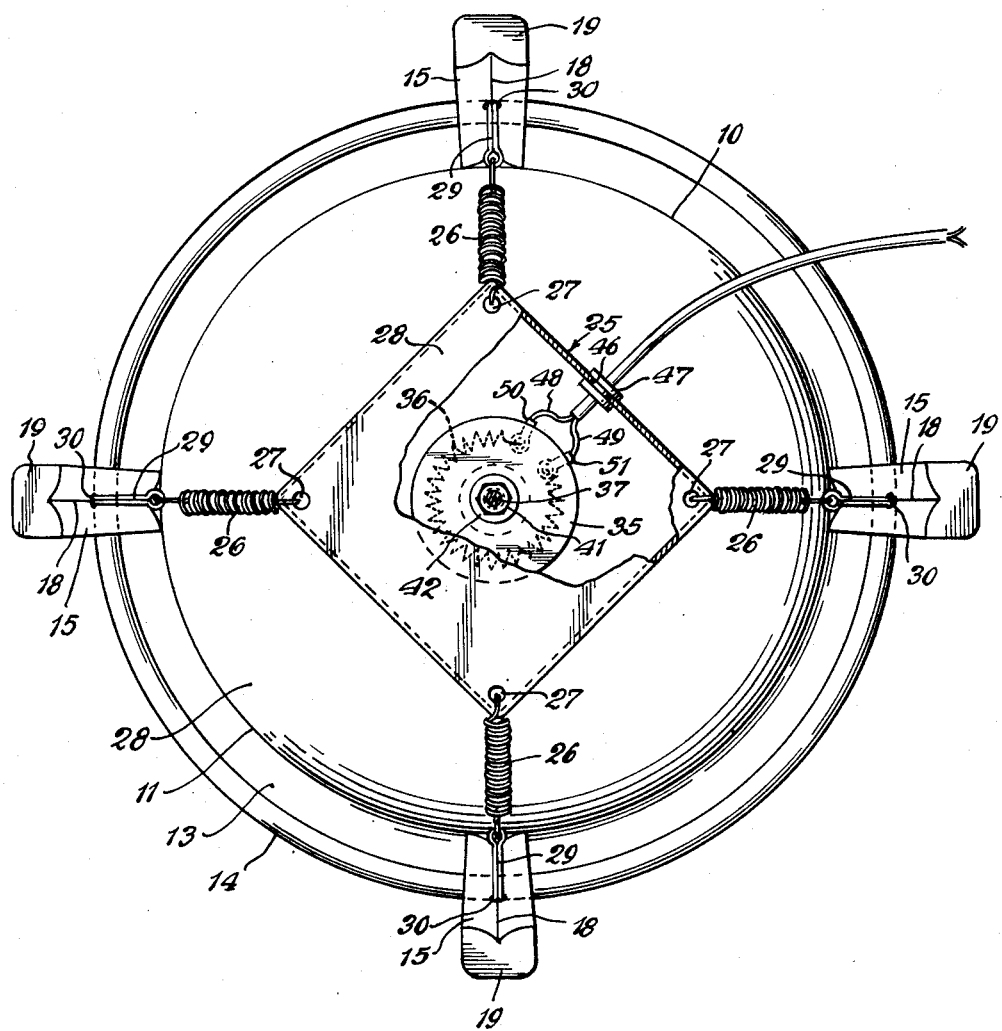

Patented May 18, 1954

2,678,992

UNITED STATES PATENT OFFICE 2,678,992

COLLAPSIBLE POULTRY WATER HEATER

Carl F. Koch, Breese, Ill.

Application September 9, 1953, Serial No. 379,154

4 Claims. (Cl. 219—43)

This invention relates to improvements in poultry water heaters.

An object of the present invention is the provision of a pan having a heating chamber detachably connected to its lower surface.

A further object is the provision of a pan having detachable legs for removably retaining a heating chamber against the lower surface of the pan.

Another object is the provision of an electric heating element in the heating chamber having adjusting means for moving it vertically therein closer to or away from the bottom of the pan.

A still further object is the provision of a device, inexpensive and simple in construction, to heat water to the correct drinking temperature for poultry.

An additional object is to provide a watering pan with a heating chamber which is readily and detachably attached to the bottom of the pan without the use of any bolts, screws or rivets extending through any part of the pan.

Another object is to provide a watering pan with removable legs and a removable heating chamber not requiring any screws or bolts for attachment.

Yet another object is to provide a structure as described in claim 2, which may be easily assembled and disassembled without the use of any tools and in its disassembled condition may be packed into a very small space for storage or shipment.

The more specific objects and advantages of the invention will become apparent from the following description wherein reference is made to the drawings in which:

Fig. 1 is a side elevational view of the device partially in section, and

Fig. 2 is a bottom plan view of the apparatus showing the bottom of the heating chamber partially in section.

Referring to the drawings, 10 is a relatively shallow water pan preferably made of metal and having a circumferential side projecting upwardly from the flat bottom portion 12. A flange 13 having an outwardly curved bead 14 is formed on the upper edge of the side 11 not only to prevent it from injuring poultry which drink from the pan, but also to serve as a support for detachable legs 15. For this reason a gap 16 is preferably left between the end of the bead 14 and the underside of the flange to accommodate a tab portion 17 formed substantially at right angles outwardly from the top of each leg 15. Each leg, made of sheet metal, is preferably formed longitudinally along a central edge 18 to provide a rigid angle section and has a horizontal foot portion 19 formed outwardly of the lower end thereof.

Means is provided on the device to simultaneously hold the legs in position and retain a box-like heating chamber 25 firmly against the lower surface 12 of the pan 10. The upper end of each leg 15 is preferably curved at 20 to form a fulcrum point of contact with the side 11 of the pan. Resilient means such as a tension spring 26 is provided on each leg below its fulcrum 20 and extends downwardly and inwardly of the device for connection with a corner of the heating chamber 25.

It is desirable that the water pan 10 be supported on four legs 15 spaced substantially at 90 degrees apart around the flange 13, each opposed pair being in line with diagonally opposite corners of the heating chamber 25. Each spring 26 may have one end attached at a corner via a hole 27 in a bottom 28 of said chamber. The opposite end of each spring may be attached to the loop of a cotter pin 29 whose free ends are inserted through a hole 30 in a leg 15 and bent in opposite directions to lock said pin and spring in position. It is essential that the hole 30 of each leg be below its fulcrum 20 and above the level of the bottom 28 of the chamber 25 in order that the spring 26 will exert an upward pull thereon. It is obvious that the heating chamber may be cylindrical instead of box-like in shape and that three legs for instance could be equally spaced around the periphery of the pan.

A heating unit 35 is located in the chamber 25 and is preferably of the well-known type having a resistance element 36 imbedded in a ceramic material to make it resistant to moisture. The unit 35 is supported at its center on an adjusting screw 37 threaded in sleeve 38 fixedly located in the bottom 28 of the chamber 25 centrally thereof. A guide collar 39 has its inner wall slidably fitting the screw 37 and its outer wall extending through a clearance hole 40 in the heating unit, the length of said collar being slightly greater than the thickness of the unit 35 at this point. A nut 41 is tightened on a washer 42 bearing against each end of the guide collar 39 to produce a lock nut effect and keep said collar from rotating in respect to the adjusting screw 37.

An electric supply cord 45 passes through a hole 46 in one side of the chamber 25, said hole being lined with a rubber ferrule 47 to prevent injury to the cord and prevent it from being freely slidable therethrough. Wires 48 and 49 of the cord are connected at 50 and 51 to the free ends of the resistance element 36 in the heating unit 35. The cord 45 is sufficiently slack in the chamber 25 to permit vertical displacement of the heating unit when it is being adjusted towards or away from the bottom of the pan 10.

Holes may be provided in the sides of the heating chamber 25 for ventilation purposes but in this particular form of the invention, for the sake of economy, the sides after being formed upwardly from the bottom surface 28 are not connected together at their ends, thus providing gaps 53 which act as vents.

In operation, the device is installed in a poultry run, coop or hatchery, and its cord 45 is connected to a nearby source of electricity. Water poured in the pan 10 is quickly warmed by heat from the heating unit 35 which is conducted through the bottom 28 of said pan. The temperature of the water is controlled at substantially the correct drinking temperature for poultry such as baby chicks or mature birds, by maintaining the heating unit 35 at various distances away from the bottom of the pan. The heating unit is lowered by rotating the adjusting screw 37 in an anticlockwise direction or raised by rotating it in a clockwise direction so that the guide collar 39 is lowered or raised to carry the heating unit 35 with it, the clearance hole 40 in said unit preventing it from rotating in respect to the collar.

The device can be collapsed for storage or shipping purposes by disconnecting the springs 26 at either end thereof to release their tension on the legs 15, thus permitting the tab portions 17 of said legs to be removed from between the bead 14 and the underside of the flange 13.

The springs provide a convenient and quick acting means for retaining the legs 15 and the heating chamber 25 in position on the pan 10. The springs are so positioned that they equalize each other and provide an upward component of force on the heating chamber and an inward component of force on the legs.

It is also evident from the foregoing description of this collapsible poultry water heater that the danger of water leaking from the pan into the heating unit is eliminated as no attaching holes, screws or gaskets are required for holding the heating unit in position.

It will be apparent that, while a commercial embodiment of the invention has been disclosed, the same is capable of modification without departure from the spirit and scope of the invention as defined in the appended claims.

I claim:

1. A collapsible poultry water heater comprising a shallow pan, a beaded flange located outwardly of the periphery of said pan, legs having their upper ends adapted to bear outwardly against said flange, a heating chamber, detachable resilient means connecting said chamber to said legs to force said legs inwardly against the sides of said pan and force said chamber upwardly against the bottom of said pan, a heating unit located in the heating chamber, and adjusting means in said chamber for raising and lowering said heating unit in relation to the bottom of said pan.

2. A collapsible poultry water heater comprising a shallow pan, a beaded flange located outwardly of the periphery of said pan, legs having their upper ends adapted to bear outwardly against said flange, a heating chamber, detachable resilient means connecting said chamber to said legs to force said legs inwardly against the sides of said pan and force said chamber upwardly against the bottom of said pan, a heating unit located in the heating chamber, a pair of wires having one set of ends connected to the opposite ends of the element of said heating unit and its other set of ends passing through the side of said chamber for connection with an electric power source, an adjusting screw threadedly mounted centrally in the bottom of said chamber, a guide collar slidably mounted on said screw and loosely extending through a hole in said heating unit, lock nuts contacting the opposite ends of said collar, the length of said collar being slightly greater than the thickness of said heating unit, whereby rotation of said adjusting screw raises and lowers said heating unit in relation to the bottom of said pan without rotating said unit.

3. A collapsible poultry water heater comprising a shallow pan, a flange located outwardly of the periphery of said pan and having a bead formed downwardly to define a gap between the end of said bead and the under side of said flange, four legs equidistantly spaced around the periphery of said pan, a tab portion formed substantially at right angles outwardly from the upper end of each leg for removable insertion in said gap, a box-like heating chamber, a spring extending upwardly and outwardly from diagonally opposite corners of the chamber for connection with the legs, a heating unit located in the heating chamber, a pair of wires having one set of ends connected to the opposite ends of the element of said heating unit and its other set of ends passing through the side of said chamber for connection with an electric power source, an adjusting screw threadedly mounted centrally in the bottom of said chamber, a guide collar slidably mounted on said screw and loosely extending through a hole in said heating unit, lock nuts contacting the opposite ends of said collar, the length of said collar being slightly greater than the thickness of said heating unit, whereby rotation of said adjusting screw raises and lowers said heating unit in relation to the bottom of said pan without rotating said unit.

4. A collapsible poultry water heater comprising a shallow pan, a flange located outwardly of the periphery of said pan and having a bead formed downwardly to define a gap between the end of said bead and the under side of said flange, four legs equidistantly spaced around the periphery of said pan, a tab portion formed substantially at right angles outwardly from the upper end of each leg for removable insertion in said gap, each leg being formed longitudinally along a central edge to provide a rigid angle section, a foot portion formed outwardly of the bottom of each leg, a curved fulcrum portion formed inwardly of each leg below its tab portion to engage the side of the pan, a box-like heating chamber, a spring extending upwardly and outwardly from diagonally opposite corners of the chamber for connection with the legs below their fulcrum points, a heating unit located in the heating chamber, a pair of wires having one set of ends connected to the opposite ends of the element of said heating unit and its other set of ends passing through the side of said chamber for connection with an electric power source, an adjusting screw threadedly mounted centrally in the bottom of said chamber, a guide collar slidably mounted on said screw and loosely extending through a hole in said heating unit, lock nuts contacting the opposite ends of said collar, the length of said collar being slightly greater than the thickness of said heating unit, whereby rotation of said adjusting screw raises and lowers said heating unit in relation to the bottom of said pan without rotating said unit.

No references cited.